Feb. 21, 1928.

F. G. NEAL 1,659,634

TIRE BUILDING APPARATUS

Filed Oct. 27, 1922    4 Sheets-Sheet 1

INVENTOR
Franklin G. Neal
BY
Edward Taylor
ATTORNEY

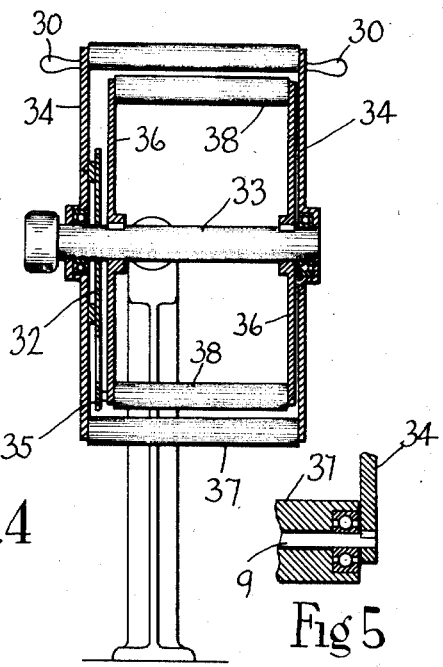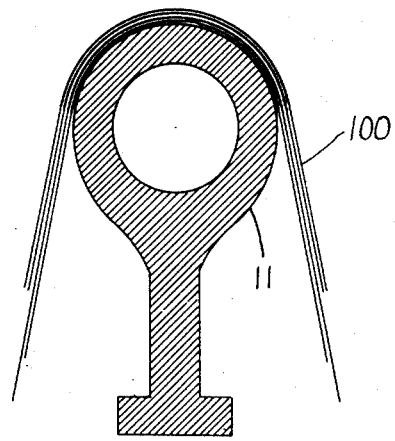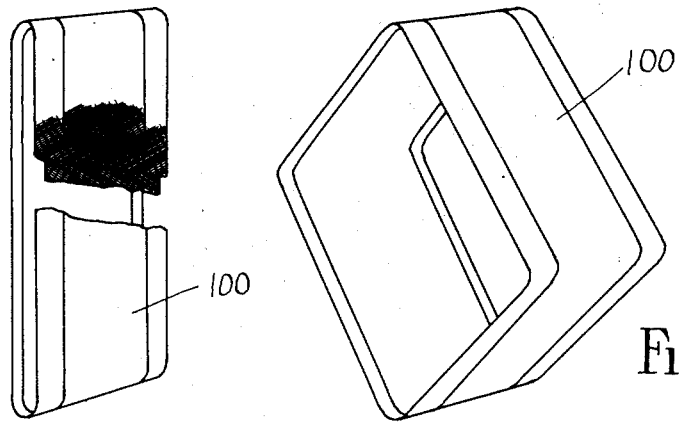

Feb. 21, 1928. 1,659,634
F. G. NEAL
TIRE BUILDING APPARATUS
Filed Oct. 27, 1922 4 Sheets-Sheet 3
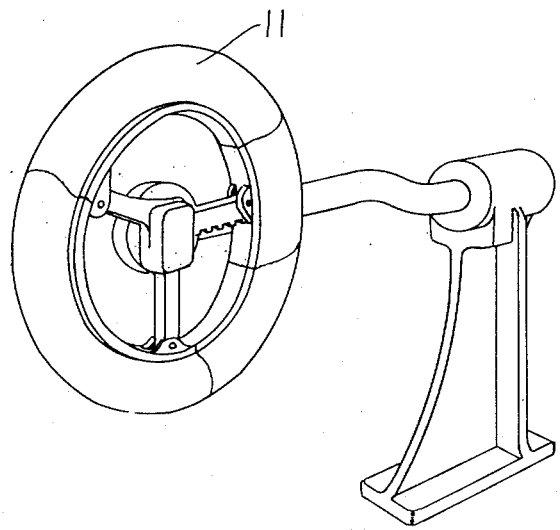
Fig.9
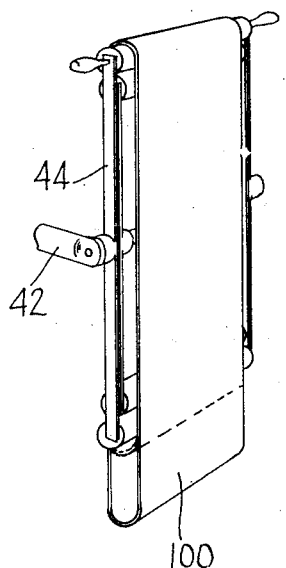
Fig.11
Fig.10
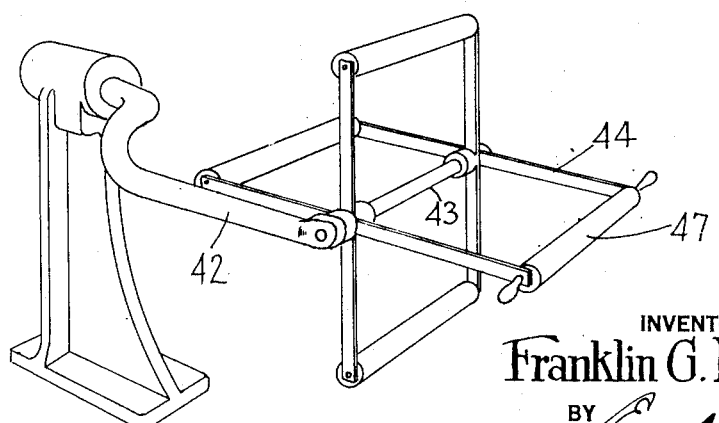
INVENTOR
Franklin G. Neal
BY
ATTORNEY

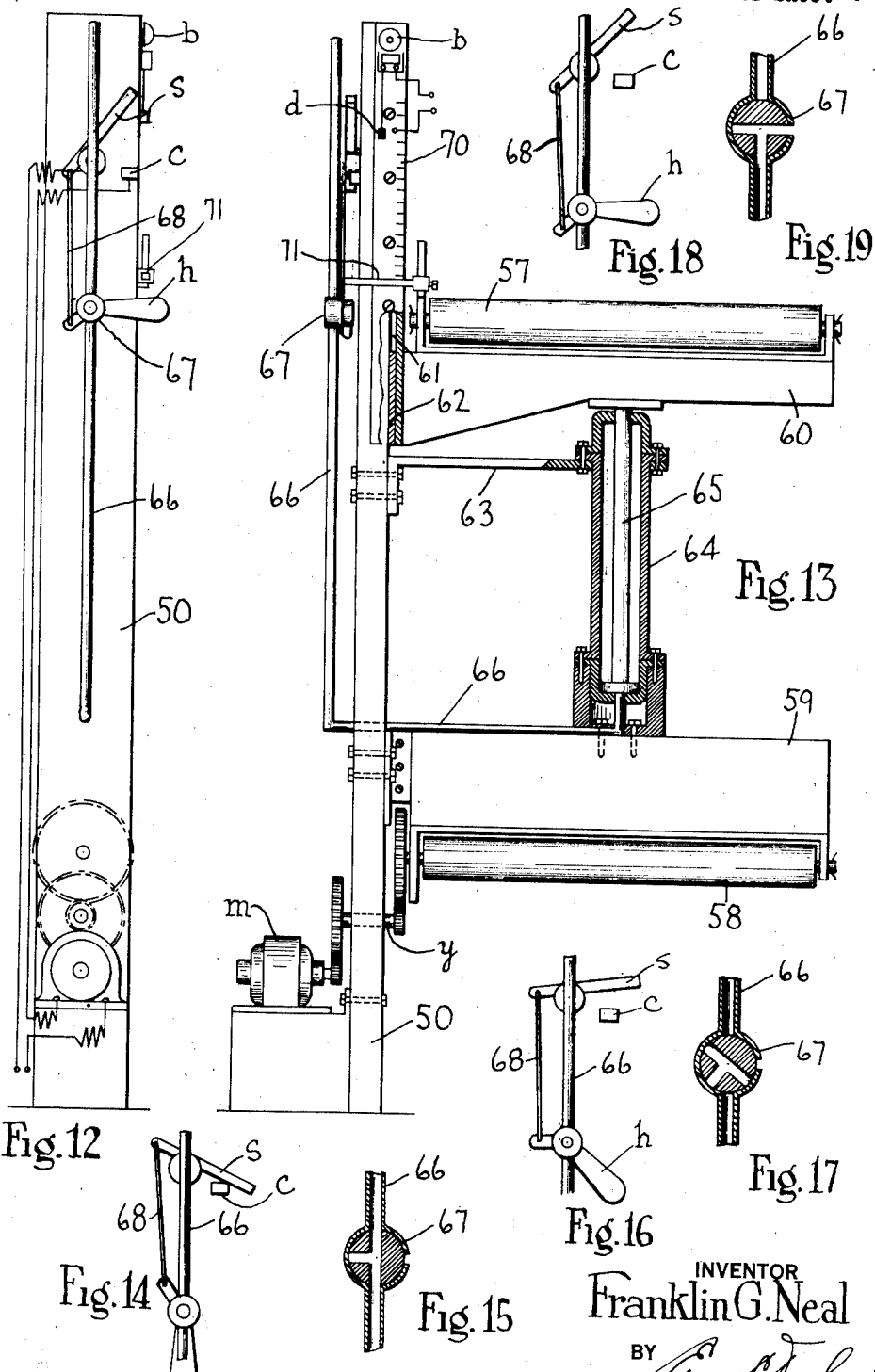

Patented Feb. 21, 1928.

1,659,634

UNITED STATES PATENT OFFICE.

FRANKLIN G. NEAL, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

TIRE-BUILDING APPARATUS.

Application filed October 27, 1922. Serial No. 597,260.

This invention relates to tire building apparatus. It is useful in the operation of stretching and tensioning the plies or laminations of carcass material, particularly in building automobile tires. This carcass material is made of strain resisting cord members and raw rubber laminated in bands or sheets. When laminated it is difficult to handle in the shaping operation for tire formation.

The principal object of the invention is to provide a simple and useful apparatus to do the work of conditioning the laminated carcass material for the tire form in which it must be built and used. Other more specific objects will appear from the description of the structure and its functions, as well as the claims.

Referring to the drawings:
Fig. 1 is a side view of a hand operated stretcher, in collapsed position, mounted on a floor stand with a part shown in section;

Fig. 4 is a sectional view of the stretcher of Fig. 3 mounted for hand operation;

Fig. 5 is a detail of the mounting for the supporting rollers;

Fig. 6 is a perspective view of an endless four ply carcass building band or pocket ready to be operated upon by my apparatus, but with a part broken away to show the arrangement of the individual plies;

Fig. 7 is a perspective view of the pocket shown in Fig. 6, but after it has been stretched to the maximum capacity of the apparatus;
Fig. 8 is a sectional view of a rigid tire building core with the pocket of Fig. 7 placed upon it for shaping and finishing operations;

Fig. 9 is a perspective view of the tire building core of Fig. 8, mounted on a floor stand or tire "buck", and ready to receive the stretched pocket for the shaping operations;

Fig. 10 is a perspective view of a slight modification of the stretcher and floor stand of Fig. 4 but in expanded position;

Fig. 11 is a perspective view of the stretcher shown in Fig. 10, but in collapsed position, and with the building pocket as it appears on the apparatus after being stretched and then released for application to the core of Fig. 9;

Fig. 12 is an end view;

Fig. 13 is a side view of a modified form of stretching apparatus; and

Figs. 14 to 19 are detail views of controlling mechanism for the modified stretcher of Figs. 12 and 13.

Figure 1:
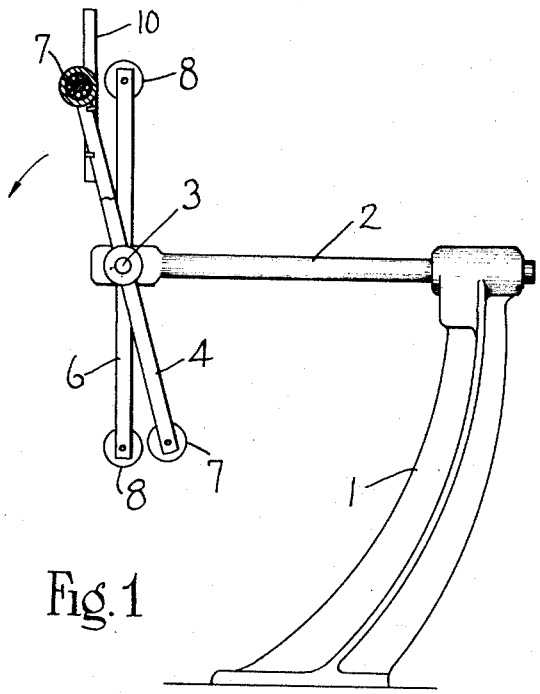

The apparatus is purposely shown quite fully and in association with the tire building core. The stretching apparatus in its various modifications is constructed to uniformly stretch the laminated band or pocket of Fig. 6 to the condition of Fig. 7 or Fig. 11, so that it may be applied and centered on the core of Fig. 8 or Fig. 9 whereon it is shaped while under tension to its tire form.

The general purpose of the apparatus will be readily understood. A proper understanding of the improvements embodied in its construction and function requires some explanation of the environment in which it is to be used.

Only one step of the many steps in the operations of tire building is performed by the apparatus of this invention. This single step, however, is one of the most difficult as well as one of the most important. It is the step of tensioning the strain resisting members of the carcass when in laminated form so that they can be placed in proper uniform positions, with relation to each other and the tire shape, to do their intended work in the finished tire. By the use of the new apparatus this preparation, tensioning, or conditioning of the laminated sheets of cords is done more conveniently and better than in prior practice.

It has been the custom to build tire carcasses by forming a two ply laminated band of rubberized cord fabric. The parallel cords are arranged in the band on the bias, and adjacent bands have their biased cords at reversed angles. The cords are held by spaced filler or weft threads, but after the rubberizing operations these weft threads are undesirable because the purpose of the rubber is to hold the cords in yielding relation one to another, and the weft threads retard the desired movement. A flat band or two ply pocket of the construction stated is, according to custom, stretched by hand over the core or former of Fig. 9, for example, and then centered on the core. The pocket is enough smaller in circumference than the periphery of the core to require the stretching operation. This hand stretching operation is limited by the strength of the workman, and to assist him only two plies are stretched at a time, even though the carcass is made with a larger number of plies. The stretching operation is desirable for shaping the band to the core. It is not uniform in the prior practice because done by hand first at one portion and then at another portion of the pocket. The presence of the filler or weft threads resists the desirable rearrangement of the cords on the core in both the stretching and shaping operations. In this coustomary operation of applying the laminated carcass material, the plies are not stretched so that they can be shaped to the core without a severe stitching or tool applying action to lay the skirts of the pocket against the core. For these and other reasons the customary step of stretching or tensioning the cord laminations, while at the same time shaping them to tire form, does not give the workman either the convenient operation or the lay of cords most desired.

According to the structural and functional principles of this invention, the workman can stretch the cord laminations in an improved manner by a convenient and suitable apparatus, and so stretched they are in the condition most desired for shaping on the core.

Before describing the various structural modifications, I will describe the apparatus in one of its simple forms, and one specific way to use it.

Figure 2:
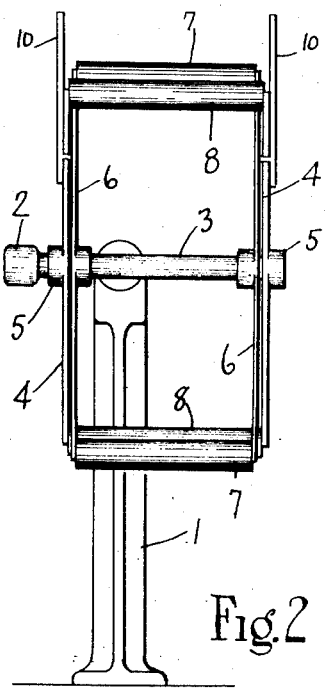
Fig. 2 is a front view of the same stretcher.

Referring to Figs. 1 and 2: A support 1 serves as a rigid support from the floor for a horizontal support 2. The latter is about waist high and as indicated in Fig. 2 has its outer portion offset from its connection with support 1. A horizontal rod 3 extends from the end of support 2 and at right angles to the support. The stretcher arms are mounted on the rod 3. The latter is fixed against turning. The stretcher arms include two spaced arms 4 mounted for rotation on rod 3. Each arm 4 has at its center a hub 5 and I preferably have a ball bearing within each hub 5 to give arms 4 an easy as well as an even and very accurate turning movement on rod 3. Just within arms 4, additional spaced arms 6 are mounted on rod 3 and in the same way except that they are fastened to the rod against any rotation. Between the outer ends of arms 4, rollers 7, and between the outer ends of arms 6 rollers 8 are mounted as shown. One desired type of mounting is indicated in Fig. 5 in which a rod 9 fastened rigidly to the ends of the arms extends loosely through the cylindrical hollow roller and holds the cones of ball bearings while the cups of such bearings are firmly held within recesses at the ends of the rollers. This mounting makes all four rollers 7 and 8 freely turning idlers. To multiply the power application of the stretcher, I may use one or two levers 10 with projections engageable with opposite edges of an arm 4 and an extension for a hand grip going beyond the end of the arm.

With this apparatus in collapsed position substantially as in Fig. 1 (when completely collapsed the rollers should be touching), an unstretched pocket 100 of laminated carcass building material which has a longitudinal dimension to fit snugly around the perimeter enclosing the four rollers 7 and 8, is placed on the rollers. The arms 4 are then slowly turned on rod 3 counter-clockwise. The pocket is immediately put under tension. It is not gripped nor anywhere bound against movement, for the cylindrical rollers 7 and 8 are idlers and turn in contact with and as the band moves. The band is flat in cross section. As it stretches in length it must decrease in width. There is frictional contact of the material with the idlers during the width shrinking movement along the axis of the rollers. This contact or friction would have a decided influence to prevent the uniform movements if the cords in the pocket for their readjustment of the stretched condition of the carcass material, except for one and possibly two provisions in the operation of the construction shown, against such action or distorting effect. By the first provision the material moves over and then away from the rollers 7 and 8 as the pocket stretches, so that with only four small areas of contact possible, and with these maintained only for a very small interval of time on any given portions of the material, such frictional contact does not have time to affect any given portions of the material so as to distort it. As soon as the material moves away from the rollers, any slight strains set up against the free movement of the band to a decreased width are immediately relieved. Substantially all portions of the laminated material are freely suspended during the stretching operation at any given instant. All portions of the laminated material are freely suspended for substantially all the time of the stretching operation. This provision leaves the laminated material in condition to adjust itself uniformly to the stretching strains without any frictional or other interference except that inherent in the laminated condition of the carcass material alone. By the second provision the pocket is kept flat in cross section and is kept moving as it is stretched. That is to say, there is no transverse shaping of the pocket as it is stretched and there is no substantial retardation of transverse movement of the pocket as it is stretched. I do not wish to limit the invention in all its aspects to the feature of means for maintaining the band flat in cross section while stretching it. I believe that the invention in some of its aspects will be found in the apparatus when used even though the pocket is crowned as by crowned rollers while it is being stretched. However, I do here point out that one very important feature of the preferred form of the apparatus, and in the best embodiment of the invention, is the provision for stretching the material without shaping it at all (but on the contrary very carefully maintaining it flat and uniform in cross section), and without retarding its movement in any way, so far as I can prevent it, to a narrower width as it is stretched.

As is apparent from the drawing the rollers for engaging the band during the stretching operation are small compared with the perimeter bounding all of them. Therefore as the band embraces the rollers and moves over them there is not sufficient area of contact to retard the transverse shrinking of the band as all the circumferential portions are stretched. This fact is emphasized when it is considered that the band moves on and off these rollers so that no particular portion is in contact therewith for any appreciable time.

As the arms 4 continue in a counter-closkwise movement, the pocket 100 continues to stretch in length and shrink in width. When arms 4 with rollers 7 are at right angles to arms 6 with rollers 8, the pocket has been stretched to the limit of the apparatus. At this limit the weak weft threads have either been broken or pulled out of any strain resisting position which they originally occupied. Due to the nature of the laminated material and the specific apparatus, it may be found desirable to start the turning movement of arms 4 through an angle less than 90° to stretch the pocket, then collapse the stretcher and start again, but turning arms 4 each time through an increased angle until they finally pass through substantially 180° once or twice. This action increases the movement of the band about the rollers 7 and 8 which I believe is desirable. The internal strains in the pocket will adjust the elements to their changing condition and without retardation by any substantial contact with elements of the apparatus. The total time necessary for the complete operation even by hand is short. For example, a four ply pocket of cord fabric for a 31x4 automobile casing, such as is illustrated in Figs. 6 and 8, can be stretched from substantially the bead circumference to the crown circumference of the shaped carass in less than one minute. This is the example described and illustrated.

The time of the stretching operation is important, because the unvulcanized rubber of the band has a tendency to set. But if the operation of stretching and rleasing the band is performed quickly enough, the band will have sufficient elasticity to shrink on the tire building form. And yet the band will remain stretched long enough to permit its removal and easy application by hand to the tire building former. Then its elasticity will cause it to shrink about the former. Because of the importance of the time element in the purpose of the expanding device, particularly in its relation to the relatively large amount of stretch given, I refer to it as quick acting. By this I mean that the device is particularly constructed and adapted for operating at sufficient speed and to give at the same time a great enough stretch to serve its fundamental purpose in the tire building operations. The latter are rather fully described in this specification to emphasize the peculiar problems overcome by the invention claimed.

After the pocket has been stretched once or twice to the condition of Fig. 7, the stretcher with the pocket on it is collapsed to a condition similar to that shown in Fig. 11 (a slight modification of Fig. 1). The stretched pocket 100 is now distinctly loose on the stretcher, hanging freely from the upper rollers in a substantially vertical position. In this position, as clearly appears in Fig. 11, the two sides of the band are in no danger of touching each other, either while the band is on the stretcher or as the operator is removing it. For this reason the stretcher is preferably constructed as shown with the stationary rolls 8 arranged vertically, avoiding the danger of the two sides of the band sticking together by reason of the uncured rubber with which the band material is coated. A horizontal arrangement of the rollers increases the hazard in this respect, especially since it makes the removal of the band more awkward. Fig. 11 indicates by the difference between the dotted and full line positions of the band the amount of stretch which has been given. The pocket is removed before it has time to shrink a substantial amount, and centered on the core 11 of Fig. 9 mounted adjacent the stretcher. This pocket, so stretched and applied to a tire shaping core, will by shrinking on the core practically shape itself. Its skirts shrink without substantial wrinkles until the bead circumference is reached. No severe stitching operations are necessary to get the material shaped on the core, and therefore the condition of the strain resisting members is quite directly determined (without outside interference) by the stretching operation followed by the shrinking of the pocket to adjust itself to the core or tire shape.

In the preferred form of the apparatus the pocket can be put on and can be taken off directly and without any interference. The facility with which the pocket can be applied to the stretcher, stretched, removed, and applied to the shaping core, is made clear from Figs. 9, 10, and 11. The shaping core shown in Fig. 9 may be conveniently supported and manipulated in the manner shown in the De Mattia Patent 1,323,164, November 25, 1919.

The stretching apparatus as stated is for the purpose of conditioning the laminated carcass material for the shaping and finishing operations to tire form. A complete tire building method in which this stretching apparatus is used to considerable advantage is fully disclosed in copending application Serial No. 594,755, Patent No. 1,536,723, May 5, 1925, filed October 16, 1922, although the use of the apparatus is not necessarily limited to this method. For example the stretcher may be used to stretch pockets which need to be stretched to follow any of the prior art tire building methods.

In the foregoing description the purpose, use, and the environment in which the apparatus may be used as an improvement in tire building is fully indicated. The modifications shown in the drawings are useful for one purpose or another as will be pointed out in connection with their description.

Figure 3:
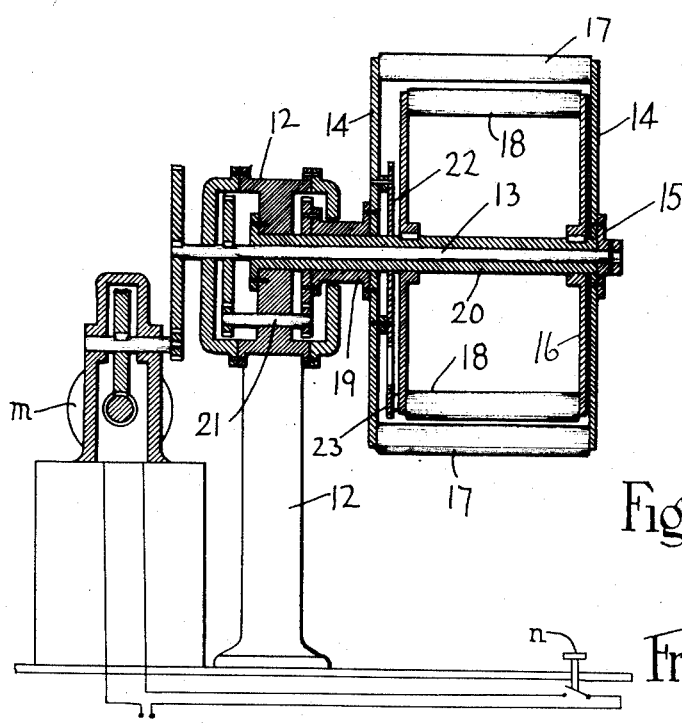
Fig. 3 is a sectional view of a slightly modified stretcher connected with mechanism for power instead of hand operation.

In Fig. 3 a power operated stretcher is disclosed. The stand 12 is provided with a horizontal cylindrical support 20 fixed against rotation on the stand as shown. The support 20 serves as a bearing for the shaft 13. On the end of this shaft there is pinned a disk 15 fastened as indicated to the middle of outer arm 14 so that shaft 13 when rotated will positively support and rotate the arm 14. The other arm 14 is rotated by its rigid connection with the hollow cylinder or hub 19 mounted for rotation over the cylinder 20 as a bearing. At the inner end of the hub 19 there is a gear connection with the jack shaft 21 mounted in the stand 12 for rotation by the gear connection indicated with the shaft 13. It will be understood that the gearing from the shaft 13 through the jack shaft 21 to the hub 19 is constructed and arranged so that the hub 19 directly connected with the inner arm 14 will be rotated at the same speed as the shaft 13 and therefore at the same speed as the outer arm 14 connected with said shaft. In this way both arms 14 are supported in parallel relation and are rotated at the same speed as the shaft 13 and both by positive connections and supports so that they may be rotated without any tortional strains to throw them out of parallel relation. Rollers 17 are mounted between the outer ends of arms 14 and these rollers 17 correspond in arrangement and mounting to the rollers 7 already described in connection with Fig. 1. Spaced arms 16 are keyed to the cylinder support 20 against rotation. These arms 16 generally correspond to the arms 6 of Figs. 1 and 2 and have at their outer ends the rollers 18 corresponding to the rollers 8 except that the arms 16 are short enough to hold the rollers 18 within the rectangle bounded by the arms 14 and its rollers 17. By this arrangement the rotation of the arms 14 carrying rollers 17 may take place through 360° whereas the arms 4 in Fig. 1 cannot rotate quite 180° according to the arrangement of the arms 6 with their rollers 8 with respect to arms 4 with their rollers 7. There is another difference in that the lower roller 18, as shown in Fig. 3, has a shaft suitably mounted in bearings held by the arms 16 and on the end of this shaft sprocket 23, so that the rotation of the sprocket in a manner to be described will rotate the roller 18. The sprocket 23 is connected by a chain to a sprocket 22. The latter is concentric with and free to rotate about the cylinder support 20. This sprocket 22 is fixed to the inner arm 14 as by suitable pins indicated in Fig. 3. With this arrangement it is clear that the rotation of the arms 14 with the shaft 13 will cause the chain connecting sprocket 22 with sprocket 23 to positively drive the roller 18. As indicated in the drawing, the sprocket 22 is much larger than sprocket 23 so that the roller 18 will be rotated much faster than the arms 14.

The power is applied to this stretching apparatus by connecting a large gear at the inner end of the shaft 13 to a spur gear on the shaft of a worm wheel driven by worm on a shaft of the motor $m$, all as indicated in Fig. 3. The switch to start and stop the motor $m$ is conveniently located as a floor or foot switch $n$ adjacent the front end of the apparatus. Of course the driving arrangements can be of any suitable character. That shown is merely to indicate one useful and simple power drive for the stretcher.

This modification of Fig. 3 is operated by placing a band, such as shown in Fig. 6, over the rolls 17. In the unstretched condition, the band 100 should make a snug fit while embracing the rollers 17. When power is applied by the motor $m$, the arms 14 are rotated in the way described while at the same time roller 18 is rotated. As soon as the arms 14 move out of parallelism with the arms 16, the rollers 18 are contacted by the band 100, and as the band is being stretched this contact is sufficient for the rotation of the driving roller 18 to cause a sufficient rotation of the band 100 about all four rollers indicated, and in a way to prevent the frictional contact of the band with any of the rolls having time to effect the distortion of any given portions of the band as it shrinks while being stretched. With this power stretcher it is apparent that more plies or stronger bands can be stretched at a single time, for example, than can be as conveniently stretched by the band apparatus of the character shown in Fig. 1. Another advantage of this modification is the fact that roller 18 causes an increased travel of the band or pocket 100 and on this account the stretching operation can take place more rapidly or more conveniently than by the apparatus of Fig. 1. The power apparatus can furthermore be so constructed and arranged that the character of the operation throughout will be determined by the apparatus and thus be insured against any particular whim of the workman, who does not always desire to follow directions when hand apparatus is used by him.

The apparatus in Fig. 4 is essentially like that disclosed in Fig. 3 except that it is hand operated. A horizontal support 33 corresponds to the support 3 of Fig. 1 and the arms 34 are mounted on the support 33 with ball bearings as shown so that these arms 34 may be more readily turned by hand, but more particularly so that the arms 34 and therefore rollers 37 will be accurately maintained in parallel relation, and twisting strains to take them out of parallel position will be avoided. Such strains would be applied if the workman did not pull evenly on both arms in a hand operation of a poorly constructed apparatus. The handles 30 are provided at the outer ends of arms 34, and it will be noted that these arms 34 hold the rollers 37 far enough out to be carried around the rollers 38 held by the inner spaced arms 36 which correspond to arms 6 of Fig. 1. These arms 36 are keyed to the support 33 so that they will not rotate, but the rollers 38 rotate and the lower roller 38 corresponds to the roller 18 of Fig. 3 so that it may be driven by the sprocket 32 and the sprocket 35 in the same manner as corresponding sprockets are arranged to drive the roll 18 already described in Fig. 3.

Figs. 10 and 11 show stretching arms and rollers similar to Fig. 4 without any positive drive for one of the rollers. The arms 44 are shown mounted on the support carried by the am 42, and in collapsed position, but with the band as it would appear on the stretcher after the latter has operated to increase its length. Fig. 10 is a perspective corresponding to Fig. 1 except that the arms 44 supported for rotation on rod 43 are shown in the position where the stretcher has moved to its limit in expanding the pocket. The arms 44 are long enough to carry their rollers under and over the rollers on the stationary arms.

Figs. 12 to 19 disclose a modification of the invention, which in many respects is quite different from the modifications already described. Referring to Figs. 12 and 13, a rigid vertical support 50 is arranged to carry a yoke 59 fixed against movement in the support 50, and a yoke 60 arranged to move vertically in suitable ways 61 provided by the in-turned metal straps 70—one fastened to each side of the support 50 and with an in-turned end spaced from and parallel to the front face of the support 50 to receive outwardly turned flanges 62 of the yoke 60, whereby the latter is supported and guided for the desired movement.

A positively driven roller 58 is mounted in the yoke 59 and is driven from the motor $m$ by means of the gear connections $y$ shown. The yoke 60 is supported on a piston rod 65 extending from the cylinder 64 suitably supported on the yoke 59 between it and yoke 60. The upper end of this cylinder is further supported against movement by a bracket 63 extending out from the front face of the support 50. The yoke 60 further supports, as indicated, the roller 57 which in this instance is an idler. The pipe 66 leading from a source of fluid pressure—air, for example—terminates in the cylinder 64 under the piston of the rod 65. A three-way valve 67 (Fig. 15) in pipe 66 when turned to the position of that figure, will admit air under pressure, to raise the piston rod 65 in the cylinder 64 and thus to raise the yoke 60 and its roller 57. When the valve is turned to the position of Fig. 17 the yoke 60 will be yieldingly held at the desired elevated position. When the valve is moved to the position of Fig. 19, the air within cylinder 64 is exhausted as shown and the yoke 60 with its supporting piston rod 65 is lowered by the weight of the parts.

Vavle 67 is turned to its various positions by the handle $h$ which has an extension beyond the valve as indicated in Fig. 12. To this extension is fastened a connecting rod 68 which in turn is fastened to one end of a pivoted switch $s$. When the pivoted switch $s$ is brought into contact with the terminal $c$ the circuit to motor $m$ is closed to establish the power whereby roll 58 is operated. It will be seen from Figs. 14, 16, and 18 that as the valve 67 is turned to raise yoke 60, to yieldingly hold it in elevated position, or to lower it, the switch $s$ is brought into contact with the terminal $c$ by the turning of the valve handle to start the motor to rotate roller 58 only while valve 67 is in position for raising the yoke 60. A vertically adjustable horizontal bar 71 of metal is carried by the yoke 60, extends across the side face of the support 50, and has a direct metallic contact (or connection by a metal spring) with the metal strap 70 as the yoke 60 is raised and lowered. The metal strap 70 is conveniently provided with a scale as indicated, so that the operator may very readily determine to what degree the yoke 60 is raised at any particular moment. This metallic bar 71 is in line with an extension of the switch *s* and since the bar 71 is adjustable it will be readily seen that it can open switch *s* to stop the motor *m* and through the connection of the switch with handle *h* turn the valve 67 to thereby stop the elevating operation of the piston 65. In this operation the valve 67 turns from the position shown in Fig. 15 to that shown in Fig. 17. In addition the bar 71 at the time it opens switch *s* contacts with terminal *d* of a circuit including the bell *b* and the metal strap 70. This circuit with the bell in it causes a signal to be given indicating that the yoke 60 has been elevated to the desired degree determined by the adjustment of the bar 71 carried by the yoke 60.

The drawings indicate the diameter of the rollers 57 and 58, the thickness of the yokes supporting the rollers, and the dimensions and location of the air cylinder with respect to the band or pocket to be stretched. The front part of the apparatus presents an open arrangement permitting the band to be telescoped onto the two rollers. The rollers suspend the band with entire freedom between them, for the yokes and the cylinder between the yokes are small enough to avoid any contact whatever with the band.

The operation of this device is as follows:

An unstretched band 100 is placed over rollers 57 and 58 in the same manner as the band, for example, is placed over the rollers already described in connection with Fig. 3. The valve handle *h* is then turned to the position of Fig. 14 to admit air to the cylinder 64 and at the same time close the circuit to motor *m* whereby roller 58 is driven rapidly to move the band 100 over each of the rollers 57 and 58, whereby the points of contact with the rollers are constantly changed. At the same time, the yoke 60 is being steadily elevated at a desired speed determined by the design of the parts and the air pressure used. When the band has been stretched by this action to the desired degree indicated in the adjustment of the bar 71 on yoke 60, the switch *s* is automatically opened, the valve handle *h* is turned to stop the elevating operation, and the bell *b* signals to the operator, who may be doing other work for the short interval of time required for the stretching operation. The operator then turns the valve 67 to the position shown in Fig. 19, whereupon the band 100 is readily removed from the rollers 57 and 58 since the yoke 60 is lowered as soon as the air is exhausted from the cylinder 64.

The advantage of this apparatus, in addition to its automatic and power operated features, is found in the fact that the band 100 has even less contact with the rollers (since there are only two of them) than it has when stretched on the floor rollers found in the other modifications of the invention.

As in the other modifications, as the band is thus suspended between the rollers, it is kept flat in cross section during the operation and the points of contact with the rollers are kept changing before the rollers have an opportunity to retard the shrinking action in the width of the pocket as it is being longitudinally stretched. It is thus seen that the work desired is performed in many respects similarly to the way in which the work is done by the other modifications. In addition the advantageous effects desired by the construction of the apparatus in all modifications on account of the small amount and character of contact between the stretching rollers and the band as it is being stretched, is to some degree increased by the construction shown in this modification of Figs. 12 and 13.

It will be clear to anyone skilled in the art that various other modifications embodying some or all of the new and useful improvements can be constructed specifically unlike those shown.

What I claim is:—

1. A tire building apparatus comprising in combination spaced parallel levers suitably pivoted for power application, a freely turning roller mounted between said levers at a distance from their pivot, and one or more other freely turning rollers mounted in the apparatus to receive an endless flat band around the perimeter bounding all of said rollers, all constructed and arranged for the movement of said levers to increase and decrease said perimeter.

2. A tire building apparatus comprising a frame support, two pairs of spaced parallel arms mounted between their ends on said support, one pair being arranged for pivoted movement about the support, and freely turning parallel rollers one mounted between the arms of each pair at each side of said support.

3. A tire building apparatus comprising a bar supported from one end, a pair of radial arms pivoted at their middle portions and spaced apart on the bar, a second pair of radial arms supported on the bar against free movement, one adjacent each of the first pair, and freely turning rollers one mounted between the outer ends of each pair of arms and on both sides of their supports.

4. A tire building apparatus comprising a bar supported from one end, a pair of radial arms pivoted at their middle portions and spaced apart on the bar, a second pair of radial arms supported on the bar against free movement, one adjacent each of the first pair, freely turning rollers one mounted between the outer ends of each pair of arms and on both sides of their supports, and means to positively rotate one of said rollers.

5. A tire building apparatus comprising a bar supported from one end, a pair of radial arms pivoted at their middle portions and spaced apart on the bar, a second pair of radial arms supported on the bar against free movement, one adjacent each of the first pair, freely turning rollers one mounted between the outer ends of each pair of arms and on both sides of their supports, and power means to turn said pivoted arms about their pivots.

6. A tire building apparatus comprising a bar supported from one end, a pair of radial arms pivoted at their middle portions and spaced apart on the bar, a second pair of radial arms supported on the bar against free movement, one adjacent each of the first pair, freely turning rollers one mounted between the outer ends of each pair of arms and on both sides of their supports, means to positively rotate one of said rollers, and power means to turn said pivoted arms about their pivots.

7. A tire building apparatus comprising in combination a pair of parallel rotatable pivoted arms, freely turning parallel rollers one mounted between the ends of said arms at each side of their pivot, a third roller parallel to the others, and means to drive said third roller by the rotation of said pivoted arms.

8. A tire building apparatus comprising in combination a frame, a hollow cylinder extending from the frame, a shaft extending through the cylinder, a radial arm fixed at its middle portion to the outer end portion of said shaft to rotate therewith, a hub mounted on said cylinder, a second radial arm fixed at its middle portion to said hub, two spaced radial arms fixed at their middle portions on said cylinder against rotation, and within said two first-named arms, a drive connection between said hub and shaft to turn them at equal speeds, means to turn said shaft and hub, and rollers one mounted between the outer ends of each of the first pair and between the outer ends of each of the second pair of radial arms at each side of their supports.

9. A tire building apparatus comprising in combination a frame, a hollow cylinder extending from the frame, a shaft extending through the cylinder, a radial arm fixed at its middle portion to the outer end portion of said shaft to rotate therewith, a hub mounted for rotation on said cylinder, a second radial arm fixed at its middle portion to said hub, two spaced radial arms fixed at their middle portions on said cylinder against rotation and within said two first-named arms, a drive connection between said hub and shaft to turn them at equal speeds, means to turn said shaft and hub, rollers one mounted between the outer ends of each of the first pair and between the outer ends of each of the second pair of radial arms at each side of their supports, and means to positively drive one of said rollers.

10. A tire building apparatus comprising in combination a frame, a hollow cylinder extending from the frame, a shaft extending through the cylinder, a radial arm fixed at its middle portion to the outer end portion of said shaft to rotate therewith, a hub mounted for rotation on said cylinder, a second radial arm fixed at its middle portion to said hub, two spaced radial arms fixed at their middle portions on said cylinder against rotation and within said two first-named arms, a drive connection between said hub and shaft to turn them at equal speeds, means to turn said shaft and hub, rollers one mounted between the outer ends of each of the first pair and between the outer ends of each of the second pair of radial arms at each side of their supports, and means to positively drive one of said rollers from a driving connection with one of said first mentioned radial arms.

11. A tire building apparatus comprising in combination a frame, a hollow cylinder extending from the frame, a shaft extending through the cylinder, a radial arm fixed at its middle portion to the outer end of said shaft to rotate therewith, a hub mounted for rotation on said cylinder, a second radial arm fixed at its middle portion to said hub, a sprocket concentric to said shaft and fastened on said last mentioned radial arm, two spaced radial arms fixed at their middle portions on said cylinder against rotation and within said two first-named arms, a drive connection between said hub and shaft to turn them at equal speeds, means to turn said shaft and hub, rollers one mounted between the outer ends of each of the first pair and one between the outer ends of each of the second pair of radial arms at each side of their supports, a sprocket fastened to one of the rollers on said last mentioned arms, and a chain connecting said sprocket with the sprocket first mentioned.

12. In a tire building apparatus, a plurality of spaced parallel rotatable rollers adapted to suport a flat band, means to separate the rollers to stretch the band, and means operable by the actuation of said separating means for rotating one of the rollers.

13. A tire band stretcher having in combination a frame, a set of pulleys therein to receive an endless elastic tire band, means to rotate one of the pulleys, and positively acting means to shift the relative positions of the pulleys for stretching the band, said shifting means being operable at a speed independently of the elastic force of the band being stretched and fast enough to avoid any substantial setting of the band in its stretched condition.

14. A tire band stretcher having in combination a frame, a set of pulleys therein to receive an endless elastic tire band, means to rotate one of the pulleys, and positively acting means to shift the relative positions of the pulleys through a cycle of movements for stretching and then releasing the band, said shifting means being operable at a speed independently of the elastic force of the band being stretched and fast enough to avoid any substantial setting of the band in its stretched condition.

15. A tire band stretcher having in combination a set of pulleys, means to rotate one of the pulleys, means to continuously change the relative position of the pulleys for stretching an elastic band on the pulleys, said last mentioned means being operable independently of the resistance of the band during the stretching operation.

16. A tire band stretcher having in combination a set of pulleys, means to drive one of the pulleys, means to shift the relative position of the pulleys while an elastic band is being stretched thereon, said pulley driving means and shifting means being operable under continuous uniform speeds during the pulley stretching operation on the band.

17. A tire band stretcher having in combination a set of pulleys and a frame to support said pulleys for assembly with an endless tire building band, means to rotate one of the pulleys, and means to shift the relative positions of the pulleys for stretching the band, both of said means being operable continuously and at constant speeds independently of the band during the complete stretching operation of the pulleys on the band.

18. A tire band stretcher having in combination a set of pulleys to suspend an elastic tire band and mechanism to manipulate the pulleys comprising means for rotating one of the pulleys and means operable to rapidly shift the relative position of the pulleys through a cycle of stretching and releasing operations whenever said mechanism operates.

FRANKLIN G. NEAL.